United States Patent [19]
Brandon et al.

[11] Patent Number: 6,145,329
[45] Date of Patent: Nov. 14, 2000

[54] METHOD FOR THE CONTROL OF THE SWITCHING ON AND OFF BEHAVIOR OF AN AIR CONDITIONING SYSTEM

[75] Inventors: Giles M. Brandon, Bascharage, Luxembourg; Francois M. Bancon, Montigny le Bretonneux, France; Vincent M. Braunschweig, Fontenay Aux Roses, France; Jean Marie M. L'Huillier, Issy les Moulineaux, France

[73] Assignee: General Motors Corporation, Detroit, Mich.

[21] Appl. No.: 09/198,013

[22] Filed: Nov. 23, 1998

[51] Int. Cl.[7] ...................................................... B60H 1/32
[52] U.S. Cl. ............................ 62/133; 62/228.5; 62/323.4
[58] Field of Search ................................... 62/133, 228.1, 62/228.4, 228.5, 323.4, 226, 227, 229, 243, 239

[56] References Cited

U.S. PATENT DOCUMENTS

| | | | |
|---|---|---|---|
| 4,531,378 | 7/1985 | Nishi et al. | 62/228.5 X |
| 4,537,042 | 8/1985 | Nishi et al. | 62/228.5 X |
| 4,841,737 | 6/1989 | Fujii et al. | 62/133 |

*Primary Examiner*—Harry B. Tanner
*Attorney, Agent, or Firm*—Patrick M. Griffin

[57] ABSTRACT

In a method for the control of the switching on behavior of an air conditioning system having a condenser, an evaporator, an expansion device and a compressor, the stroke of which can be set via a valve, the compressor is driven by a drive via a clutch. The imminent or already accomplished engagement of the clutch is detected as an event by an electronic control system of the air conditioning system. In the method the valve for the control of the stroke of the compressor is actuated in dependence on the event by the control system in order to minimize the torque fluctuations transmitted to the drive.

7 Claims, 9 Drawing Sheets

METHOD FOR THE CONTROL OF THE SWITCHING ON AND OFF BEHAVIOR OF AN AIR CONDITIONING SYSTEM

TECHNICAL FIELD

The present invention relates to a method for the control of the switching on behavior and/or switching off behavior of an air conditioning system and to an air conditioning system for carrying out this method.

BACKGROUND OF THE INVENTION

Air conditioning systems for the setting of a desired room climate are known in principle and have a condenser, an evaporator, an expansion device (either an orifice or a thermal expansion valve) and a compressor. Compressors with variable displacement are often used with an evaporator off air temperature or an evaporator fin temperature sensor in air conditioning systems, in particular automotive air conditioning systems. The driving of the compressor of an air conditioning system of this kind is usually done by the drive aggregate of the vehicle, with the force transmission usually taking place via a belt or the like. The coupling in of the drive takes place in this through a clutch which is electrically controllable. Through engaging and disengaging of the clutch, however, torque fluctuations can be transmitted to the drive train of the vehicle, which is noticeable by the vehicle passengers as a jolt.

Furthermore the wear of the clutch plates is increased through an uncontrolled engaging and disengaging of the clutch.

SUMMARY OF THE INVENTION

It is an object of the present invention to provide a method for the controlling of the switching on behavior and/or the switching off behavior which increases the driving comfort.

It is a further object of the present invention to provide a method for the controlling of the switching on behavior and/or the switching off behavior which reduces the wear on the clutch and thereby increases the lifetime of the clutch.

It is a further object of the invention to provide an air conditioning system which is suitable for carrying out the named method.

In accordance with the present invention a method is provided for the control of the switching on behavior of an air conditioning system which has a condenser, an evaporator, an expansion device and a compressor, the stroke of which can be set via a valve, with the compressor being driven by a drive via a clutch, the imminent or already accomplished engagement of which is detected as an event by an electronic control system of the air conditioning system. In the method the valve is actuated in dependence on the event by the control system in order to adapt the stroke of the compressor and thereby to minimize the torque fluctuations transmitted to the drive.

In accordance with the invention the control system enables the imminent or already accomplished engagement of the clutch to be detected as an event. For example the control system can sample the on switch of the air conditioning system and engage the clutch with a time delay or simultaneously with the actuation of the on switch. The desired or already accomplished engagement of the clutch is registered as an event by the control system and the valve of the compressor which controls its stroke is actuated in such a manner that torque fluctuations which are transmitted to the drive and which could arise through the coupling in of the compressor are minimized.

Advantageous embodiments of the invention are described in the subordinate claims.

It is advantageous when the valve is actuated on the detection of an event in such a manner that the stroke of the compressor is reduced, preferably minimized. Through this the stroke of the compressor is chosen as small as possible during the engagement, so that the torque fluctuation of the drive which arises through the engagement of the compressor is likewise minimized. The stroke of the compressor can then be increased, which is preferably done gradually or slowly respectively in order to put the air conditioning system into a desired operating state.

In accordance with a further aspect, the invention relates to a method for the control of the switching off behavior of an air conditioning system having a condenser, an evaporator, an expansion device and a compressor, the stroke of which can be set via a valve, with the compressor being driven by a drive via a clutch. A desired switching off of the air conditioning system when the drive is running is detected as an event by an electronic control system and the valve of the compressor is actuated in dependence on the event by the control system in order to minimize the torque fluctuations transmitted to the drive. A gentle switching off of the compressor is achieved in this method when for example the drive aggregate of the vehicle is still in operation, for example when the air conditioning system is switched off during travel.

It is particularly advantageous when the valve is actuated on the detection of an event in such a manner that the stroke of the compressor is reduced, whereupon the clutch can be disengaged when a predetermined small stroke is reached.

It is also advantageous when other control routines of the electronic control system are first switched off following the detection of the event in order to enable the gentle switching off of the compressor. In this a valve position can be used as the starting point of the control process for controlling the switch off behavior when switching off the other control routines.

In accordance with a further aspect of the present invention the latter relates to a method for the control of the switching off behavior of an air conditioning system having a condenser, an evaporator, an expansion device and a compressor, the stroke of which can be set via a valve, with the compressor being driven by a drive via a clutch. An imminent or already accomplished disengagement of the clutch is detected as an event by an electronic control system and the valve is actuated in dependence on this event by the control system in order to effect a definite position of the compressor.

This method in accordance with the invention can always be used when a disengagement of the clutch takes place, for example because the drive aggregate of the vehicle has been switched off or because other safety mechanisms have caused a disengagement of the clutch. It is ensured by this method in accordance with the invention that the compressor assumes a definite position when it is switched off so that no undesirable stressing of the clutch arises when it is later switched back on and no excessive torque fluctuations are transmitted to the drive aggregate of the vehicle.

The present invention involves a soft start routine (claim 1) and soft stop routines (claim 4 and 8) for minimizing torque impulses to the drivetrain during compressor clutch engagements and disengagements. The soft start routine involves ramping the duty cycle for a PWM control valve after clutch engagement in order to smoothly upstroke the compressor from a minimum stroke position. The initial value for the duty cycle ramp is calibrated to be a function of the compressor speed.

Further, the present invention provides for two different soft stop routines. A relaxed soft stop (claim 4), which occurs when the user switches off the A/C, involves ramping the duty cycle for the PWM control valve in order to smoothly destroke the compressor to a minimum stroke position. A cut out soft stop routine (claim 8), which occurs when the engine control or climate control module disengages the compressor clutch, involves step changing the duty cycle for the PWM control valve in order to rapidly destroke the compressor to a minimum stroke position.

The relaxed and cut out soft stop routines, either ramp or step change the duty cycle in order to park the compressor at a minimum stroke position.

According to the present invention, the driveability is improved by minimizing the torque impulses to the drivetrain during compressor clutch engagements and disengagements. The clutch plate wear is reduced and the clutch lifetime is extended by minimizing torque impulses during clutch engagements.

BRIEF DESCRIPTION OF THE DRAWINGS

The present invention will now be described, by way of example, with reference to the accompanying drawings, in which.

DESCRIPTION OF THE PREFERRED EMBODIMENT

Figure 9:
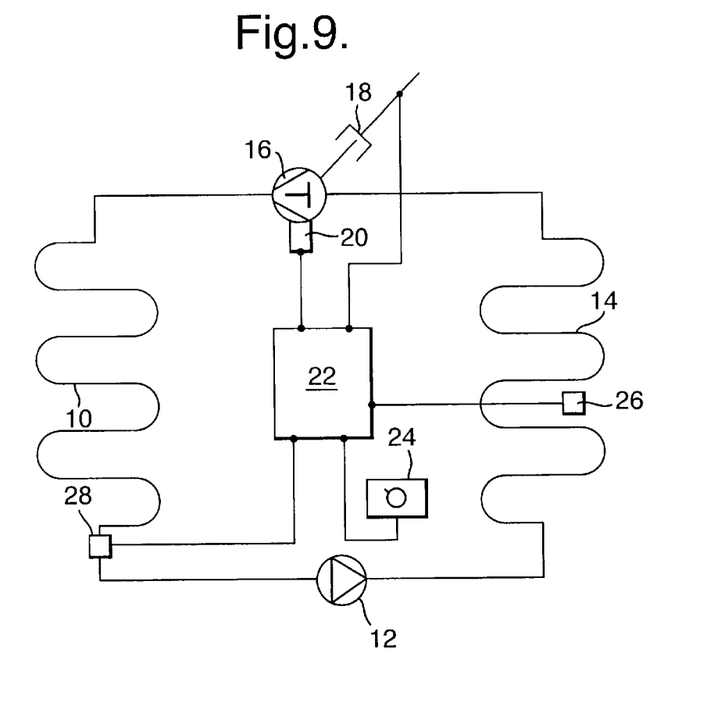
FIG. 9 is a schematic illustration of an air conditioning system for carrying out the method in accordance with the invention.

As shown in FIG. 9, an air conditioning system in accordance with the invention, which can be designed in particular as a vehicle air conditioning system, has a condenser 10, an expansion device 12, an evaporator 14 and a compressor 16, which are connected to one another in the named sequence. The compressor 16 is driven by the drive motor of a vehicle via a non-illustrated belt, with it being possible to couple in the drive via a clutch 18.

The compressor is designed as a variable displacement compressor, with the displacement of the compressor being variable via a solenoid valve 20.

An electronic control system 22 is provided for the temperature regulation of the air conditioning system illustrated in FIG. 9. A setting unit 24 for the setting of a desired cabin temperature (evaporator outlet air temperature or evaporator fin temperature) is connected to the control system 22. Furthermore, the control system 22 produces electric signals by means of a pulse width modulation which control the valve 20 of the compressor 16. The clutch 18 is likewise controlled by the control system 22, for example in order to effect an engagement of the clutch when the air conditioning system is switched on.

A temperature sensor 26 which is connected to the control system 22 serves for the measurement of the evaporator outlet air temperature (the evaporator off temperature or evaporator fin temperature). Furthermore, a pressure sensor 28 is provided at the refrigerant outlet of the condenser 10 which determines the condenser outlet refrigerant pressure and transmits it to the control system 22.

For all test results shown in FIGS. 1 to 8, the blower fan speed was set to 3 and the engine cooling fan speed controlled automatically. The soft start routine was evaluated for different gears (neutral, $1^{st}$, $3^{rd}$ and $5^{th}$), different compressor speeds (1000 rpm in neutral, 2500 and 4000 rpm in $1^{st}$, $3^{rd}$ and $5^{th}$ gear) and different ambient conditions (24 and 40° C.).

The cut out soft stop routine was evaluated at 1000 rpm in neutral gear in 24 and 40° C. ambients.

The relaxed soft stop was evaluated for different gears (neutral, $1^{st}$, $3^{rd}$ and $5^{th}$), different compressor speeds (1000 rpm in neutral, 2500 and 4000 rpm in $1^{st}$, $3^{rd}$ and $5^{th}$ gear) and different ambient conditions (24 and 40° C.).

The peak crankcase-suction pressure differentials, compressor upstroking/destroking behaviour and subjective assessment of impact to the drivetrain were recorded during the tests.

Soft Start Routine

Figure 6:
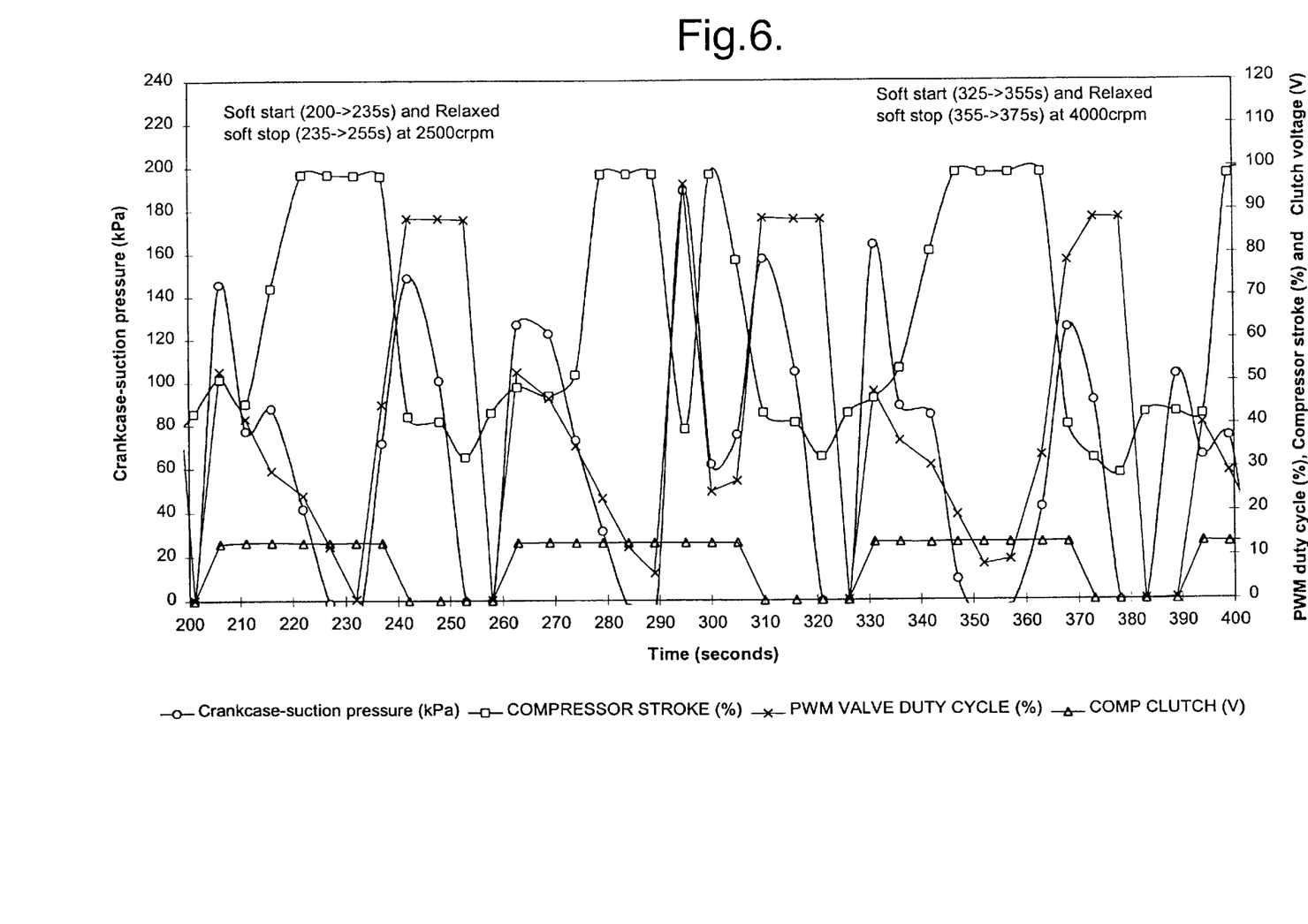
Figure 7:
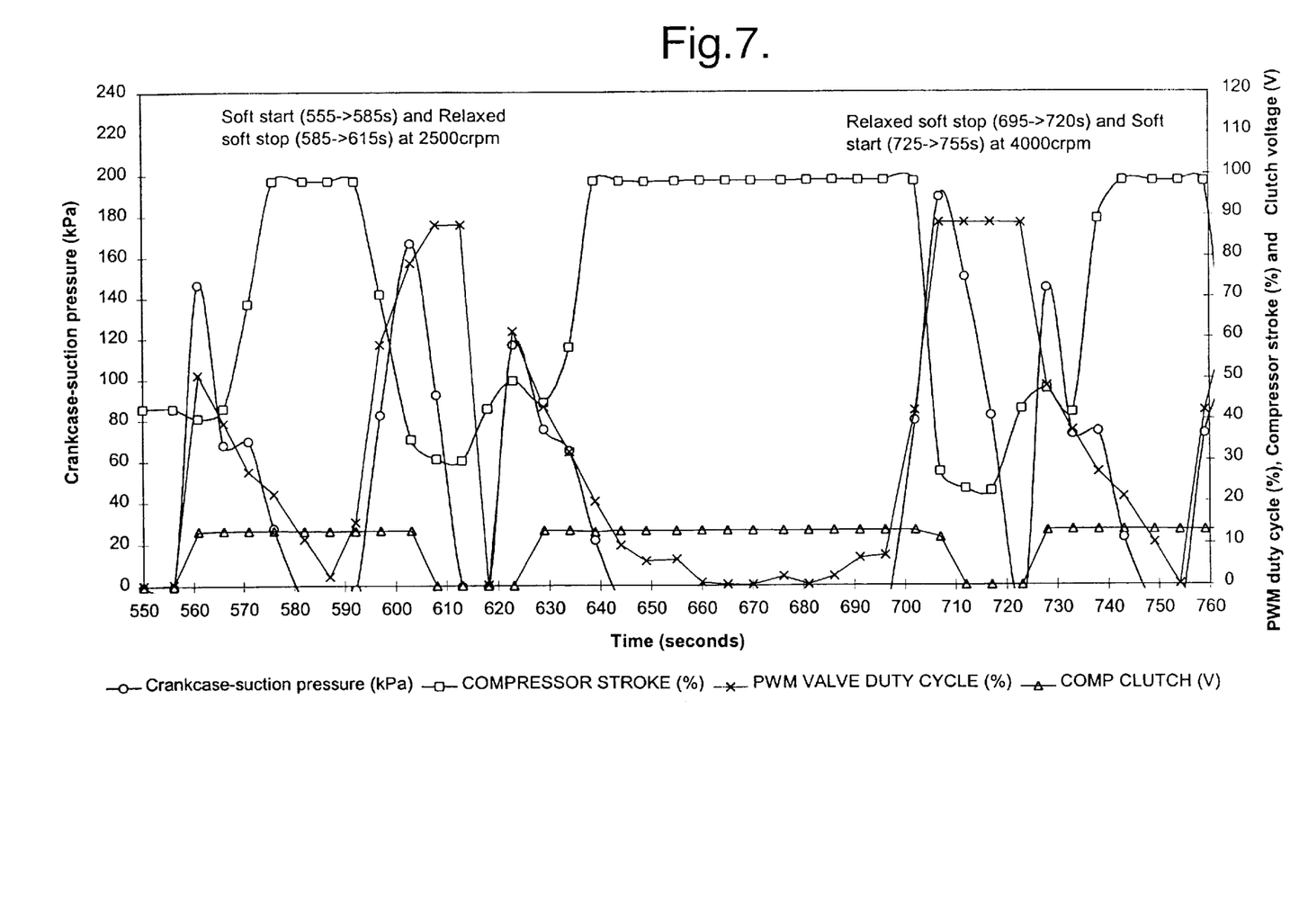
Figure 8:
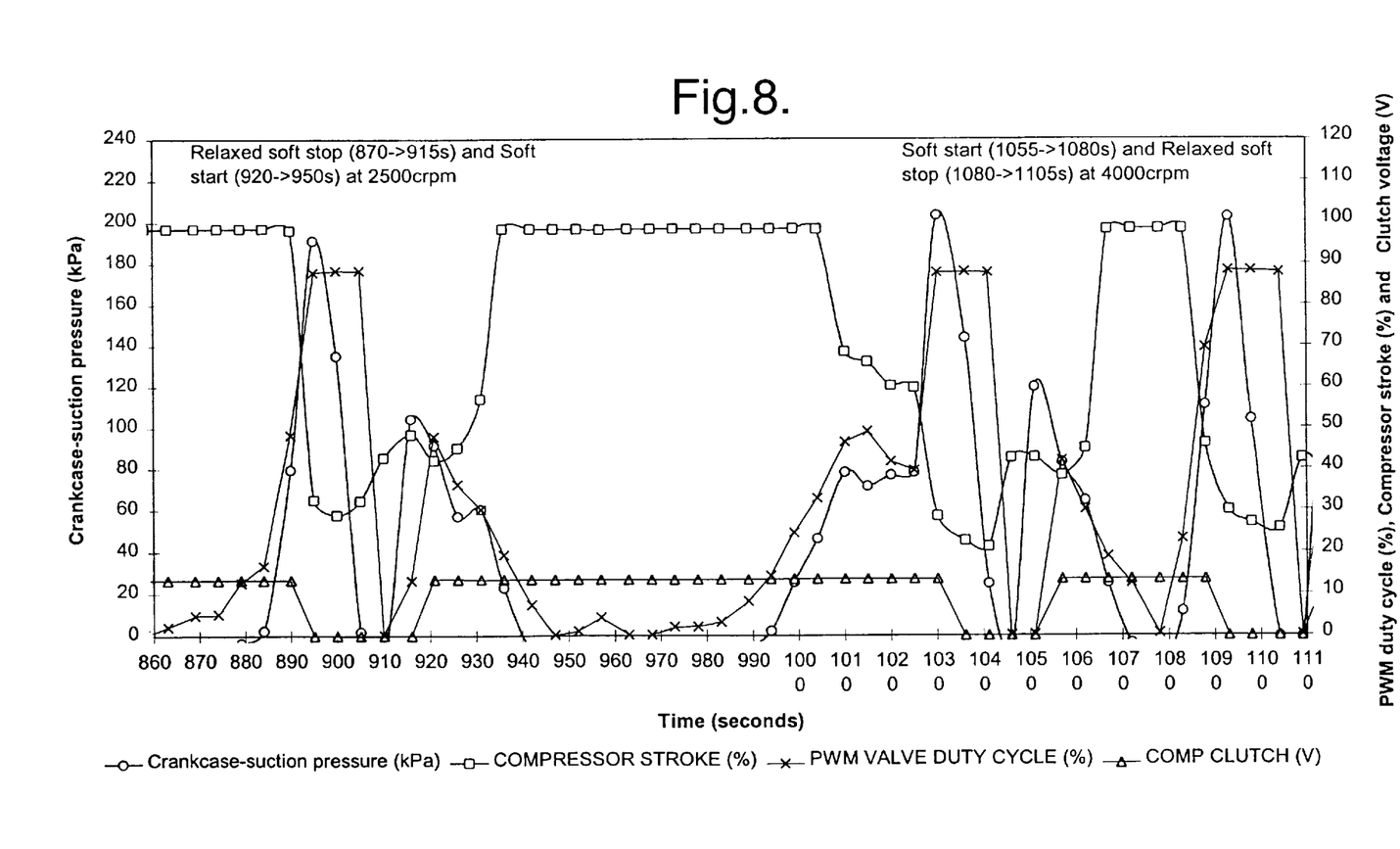

The highest peak crankcase-suction pressure differential pressure recorded was 1.6 bar (see FIG. 6, $1^{st}$ gear, 4000 crpm, 40° C. ambient).

Upon initial clutch engagement the compressor was typically held for 5 to 15 seconds at approximately 45% stroke. Only once the PWM signal for controlling the valve of the compressor had been ramped down to somewhere between 50 to 30% duty cycle would the compressor begin upstroking from 45 to 100% stroke. At this transition point the crankcase-suction differential pressure would have dropped down to between 0.5 to 10 bar. The time to travel from 45 to 100% stroke would last from 5 to 10 seconds.

Soft starts could not be detected through the drivetrain, except at 1000 rpm in neutral due to a slight increase in engine speed caused by the engine management system responding on purpose to the clutch engagements.

The soft start routine which is executed anytime the system transitions from a disengaged to engaged clutch state serves to hold the stroke at minimum (e.g. 43%—a possible return spring resting position) during the transition to the engaged clutch state so as to avoid a noticeable impulse in engine load. After holding the stroke at the 43% position, the routine allows for a slow upstroke of the compressor to full stroke.

The soft start routine performs the following tasks:

a) Upon clutch engagement, an initial output duty cycle is chosen as a function of compressor speed based on a lookup table and linear interpolation scheme. The initial duty cycle increases with lower compressor speed.

b) An internal timer is started which will be used to synchronize modifications to the duty cycle once per second.

c) While the duty cycle is greater than or equal to 5%, the duty cycle is decremented at a calibratable rate once each second.

d) Once the duty cycle drops below 5%, the soft start routine terminates. Program control is then transferred to a PID control routine for regular operation.

Relaxed Soft Stop Routine

Figure 1:
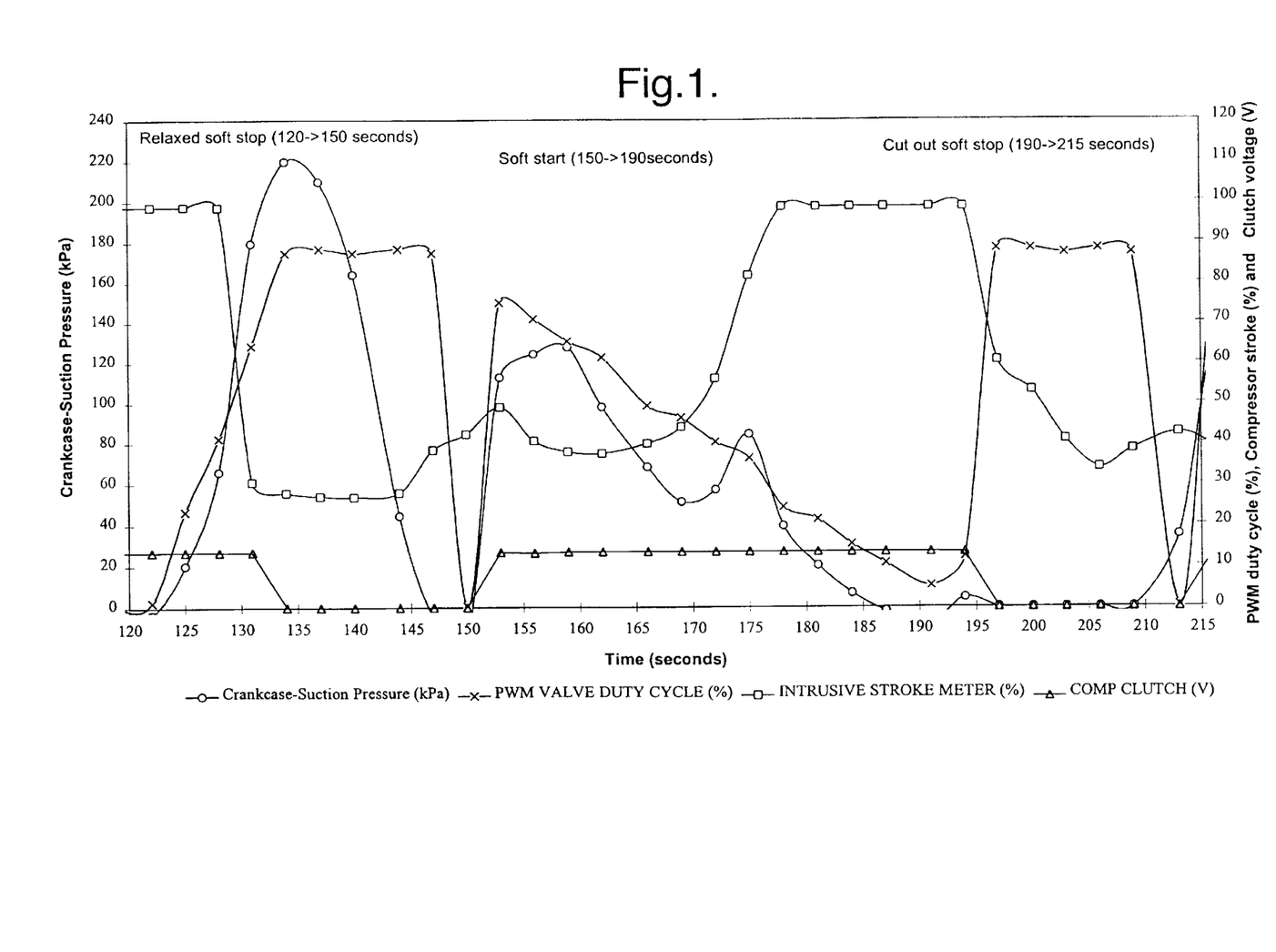
FIG. 1 to FIG. 8 show test results in carrying out methods in accordance with this invention.
Figure 2:
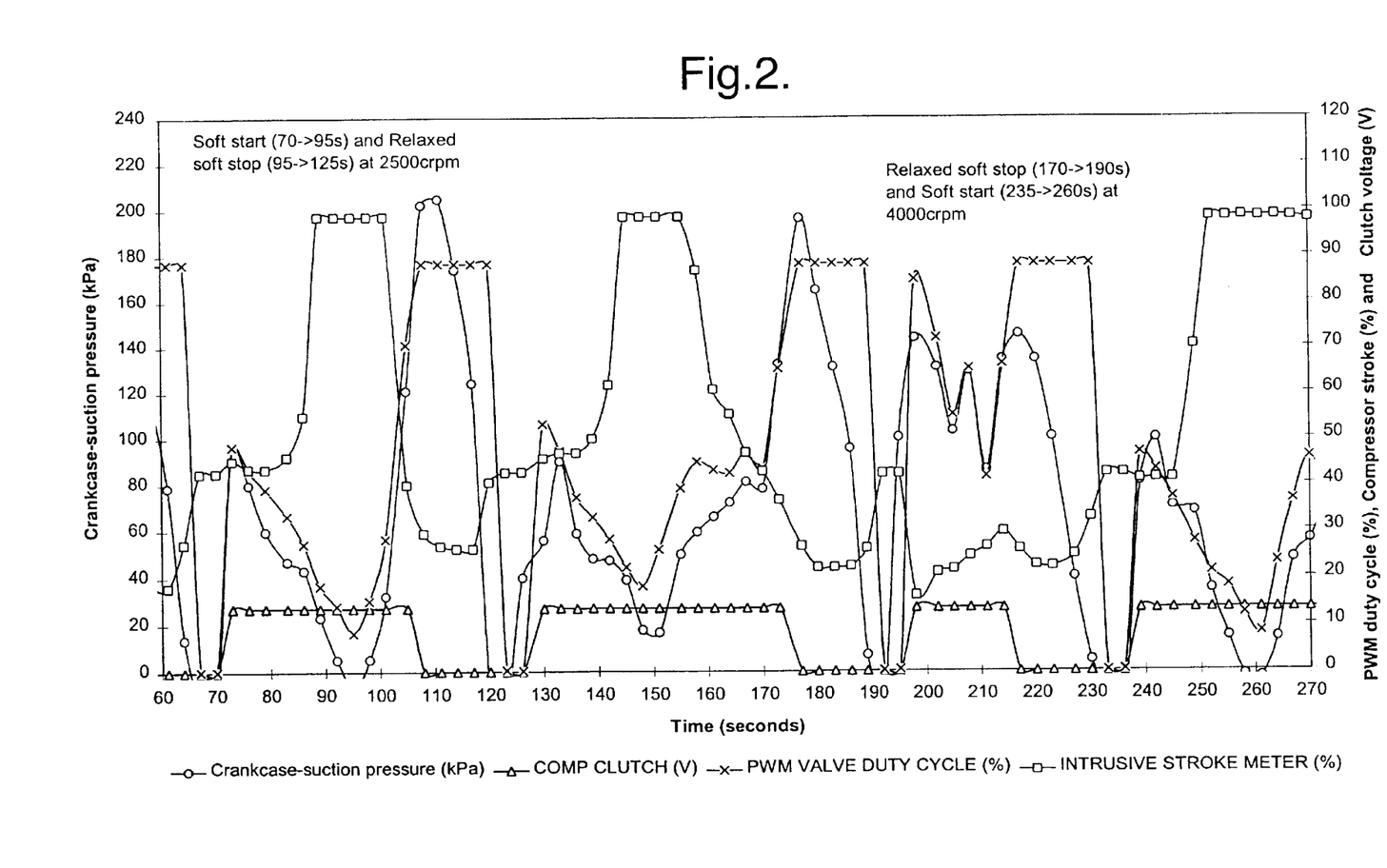
Figure 3:
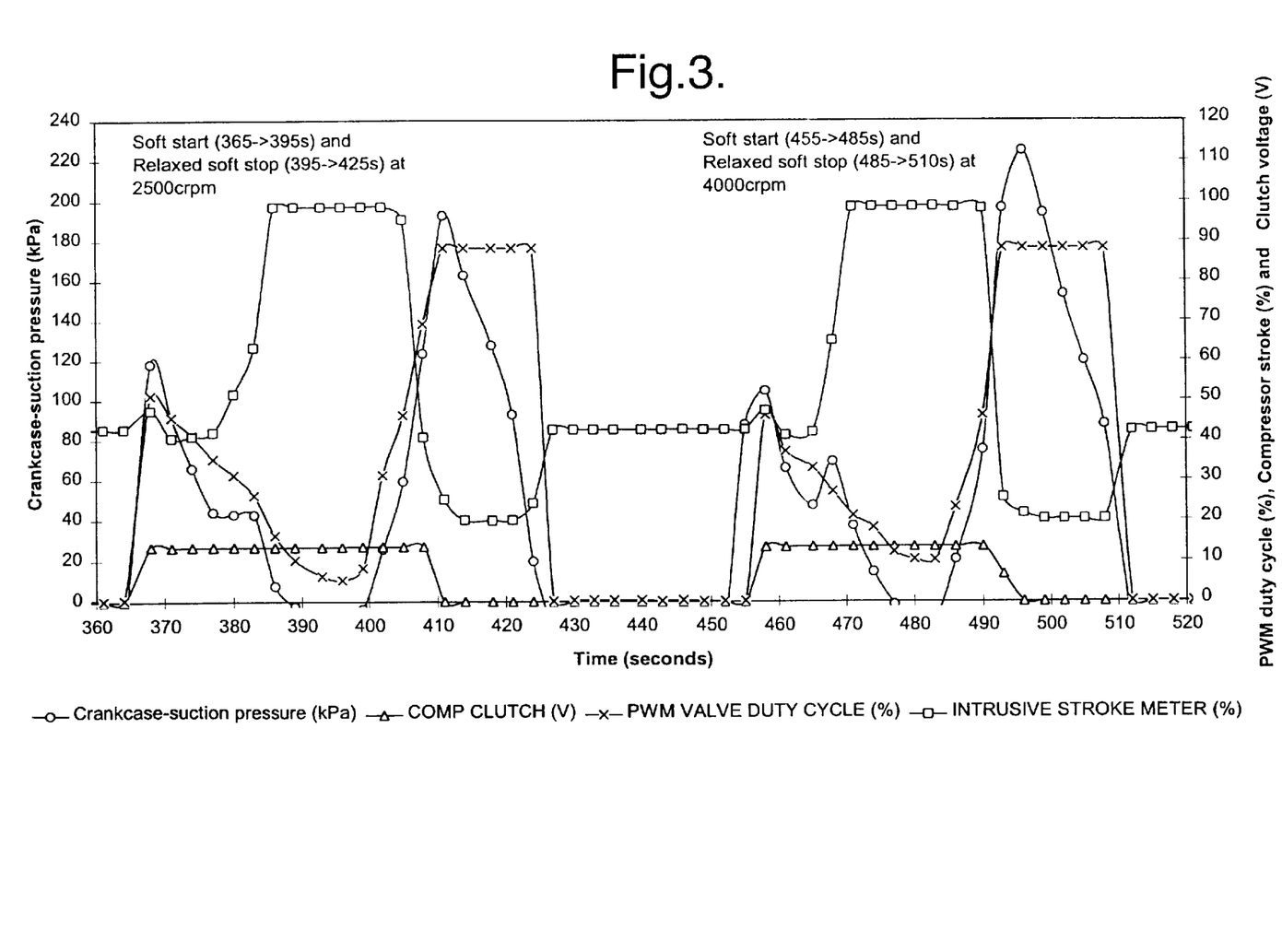
Figure 4:
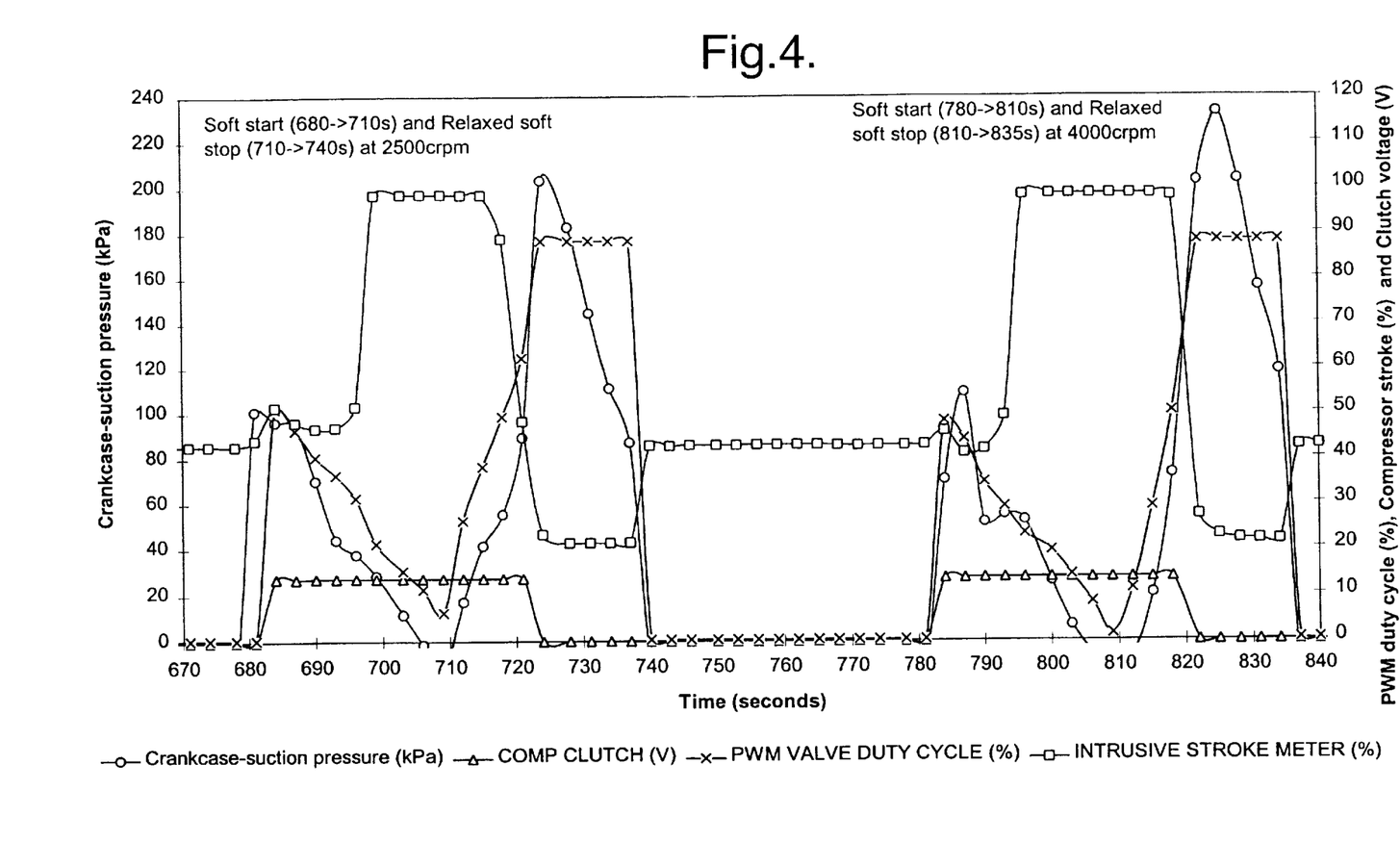
Figure 5:
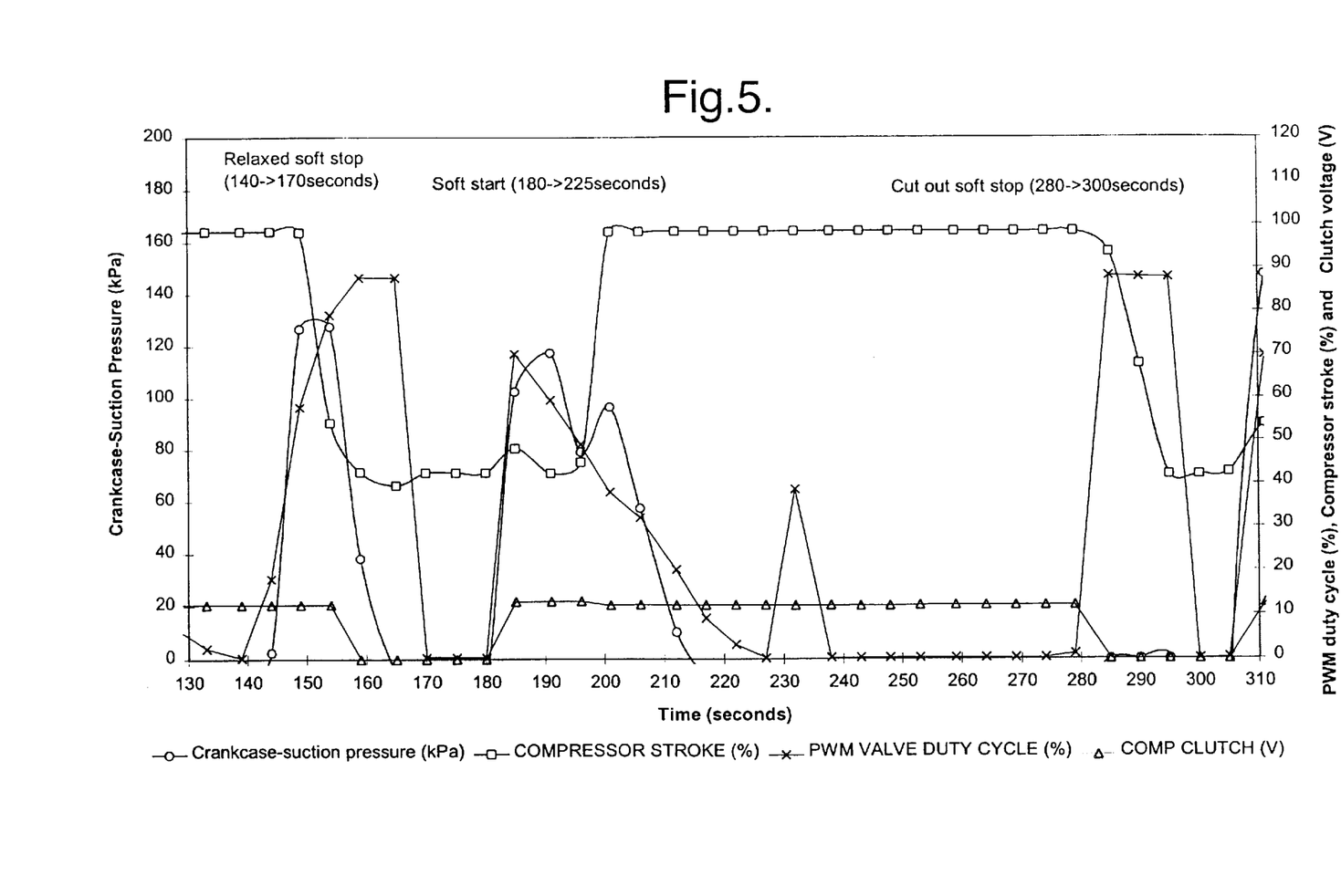

The highest peak crankcase-suction differential pressure recorded was 0.35 bar (see FIG. 4, $4^{th}$ gear, 4000 crpm, 24° C. ambient).

The PWM signal would typically need to ramp up to between 30 to 50% duty cycle before a full stroke compressor would begin destroking. At the transition point, the crankcase-suction differential pressure climbs to between 0.6 to 1 bar. Once the destroking had begun, the compressor would require approximately 5 to 10 seconds before reaching a minimum stroke of approximately 35%. After the relaxed soft stop routine had finished, the return spring would immediately force the compressor to 43% stroke.

Relaxed soft stops could not be detected through the drivetrain, except at 1000 rpm in neutral due to a slight decrease in engine speed caused by the engine management system responding on purpose to the clutch disengagements.

The relaxed soft stop routine is employed to attempt to destroke the compressor to 43% stroke (the return spring resting position) which is invoked when the user no longer desires A/C by switching the A/C request to the OFF position. This routine is in effect only while the compressor is still spinning.

The relaxed soft stop routine performs the following tasks:

a) The routine is entered when the A/C request is switched to the OFF position.

b) The regular controller routines internal to the software (PID routines) are turned OFF.

c) The last duty cycle value calculated by the PID routine is stored and is used as the starting point of the relaxed soft stop.

d) An internal timer is started which will be used to synchronize modification to the duty cycle once per second.

e) While the duty cycle is less than or equal to 90%, the duty cycle is incremented at a calibratable rate once each second.

f) Once the duty cycle exceeds 90%, the relaxed soft stop routine terminates. Program control is then transferred to a further routine (cut out soft stop routine) provided that conditions have not warranted a clutch re-engagement, i.e. the user has since switched A/C request back to the ON position.

Cut Out Soft Stop Routine

The compressor typically takes between 10 to 15 seconds before being reduced to approximately 40% stroke. After the cut out soft stop routine had finished the return spring would immediately force the compressor to 43% stroke.

The cut out soft stop routine is invoked whenever the compressor transitions from an engaged to disengaged clutch state. This routine will be executed under the following conditions:

After the completion of relaxed soft stop when the user has turned off A/C request.

When the user turns off the ignition while the A/C is in operation.

Anytime a clutch cut-out occurs for any reason (i.e. high speed, high head pressure).

The purpose of the cut out soft stop routine is twofold. When executed after the relaxed soft stop, the intention is for the algorithm to allow system pressures a chance to equalize such that any available pressure will not upstroke the compressor after the clutch disengagement. This is to ensure the compressor is "parked" at the 43% stroke position.

The second intention of the routine is to actively destroke the compressor in the case of sudden clutch cut outs. In many cases, there is enough available pressure in the system to move the compressor stroke for as much as 15 to 20 seconds after clutch disengagement with an orifice tube system. The routine energizes the valve and opens the compressor crankcase to the discharge line which provides the necessary pressure for destroking.

The cut out soft stop routine performs the following tasks:

a) Start a timer which will run for a calibratable period of time which is preferably 15 seconds.

b) Immediately transition to a 90% output duty cycle, if not already there.

c) Continue to output the 90% duty cycle for the duration of the counter.

d) When the timer has expired, the valve is de-energized. The software will then wait for conditions to be appropriate for entering soft start on the next clutch engagement.

Figure 10:
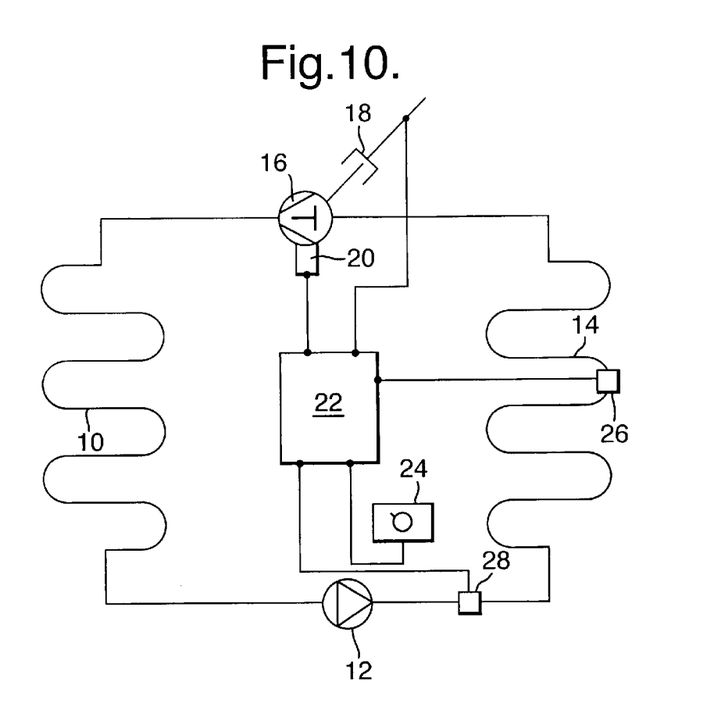
FIG. 10 is a schematic illustration of an alternative air conditioning system for carrying out the method in accordance with the invention.

FIG. 10 shows an alternative embodiment of a system using an air-conditioning system similar to that of FIG. 9. However, in contrast to the first embodiment, the air-conditioning system according to FIG. 10 has a pressure sensor 28 mounted at the entrance of the evaporator 14 (low side pressure sensor). Further, the temperature sensor 26 is mounted on a fin of the evaporator 14.

It should be noted that the alternatives of FIG. 10 can be combined with the system shown in FIG. 9. This means that the pressure sensor 28 can alternatively be arranged on the high pressure side or on the low pressure side. Further, the pressure sensor 28 can be arranged at the input or at the output side of the condenser 10 and the evaporator 26, respectively. Further, it is possible to measure the evaporator outlet temperature, or alternatively, the evaporator fin temperature. If corresponding alternatives are chosen, the controllers 30 and 34 and the corresponding control loops 31 and 32 are to be adapted correspondingly.

What is claimed is:

1. Method for the control of the switching on and off behavior of an air conditioning system having a compressor, the stroke of which is set via a variably activated valve, and a user operated A/C switch to turn the air conditioning system on and off, with the compressor being driven by a drive via a clutch that is engaged or disengaged, the imminent or already accomplished engagement or disengagement of which is detected as an event by an electronic control system of the air conditioning system, said method comprising the steps of:

progressively adjusting the activation of said valve to a predetermined setting corresponding to a minimum compressor stroke when the imminent or already accomplished disengagement of the clutch is detected due to a turn off of the air conditioning system by the user operated A/C switch; and immediately adjusting the activation of said valve to said predetermined setting when the imminent or already accomplished disengagement of the clutch is detected due to a condition other than turn off of the air conditioning system by the user operated A/C switch.

2. The method of claim 1, including the step of:

maintaining the valve at said predetermined setting for a predetermined interval of time.

3. The method of claim 1, wherein operating power for the clutch is obtained via a user operated ignition switch, and said condition other than turn off of the air conditioning system by the user operated A/C switch includes an opening of the user operated ignition switch.

4. The method of claim 1, wherein the clutch is disengaged by the electronic control system during operation of the air conditioning system in response to one or more predefined conditions, and said condition other than turn off of the air conditioning system by the user operated A/C switch includes disengagement of the clutch by the electronic control system.

5. The method of claim 1, including the step of:

immediately adjusting the activation of said valve to an initial setting when the already accomplished engagement of the clutch is detected, and then progressively adjusting the activation of said valve from the initial setting to a setting corresponding to a maximum compressor stroke.

6. The method of claim 5, wherein the initial setting is determined as a function of a speed of the compressor when the already accomplished engagement of the clutch is detected.

7. The method of claim 6, wherein the function between compressor speed and the initial setting is such that the compressor stroke corresponding to the initial setting decreases with increasing compressor speed.

* * * * *

UNITED STATES PATENT AND TRADEMARK OFFICE
CERTIFICATE OF CORRECTION

PATENT NO.   :   6,145,329

DATED        :   November 14, 2000

INVENTOR(S)  :   Giles M. Brandon; Francois M. Bancon;
                 Vincent M. Braunschweig; Jean Marie M. L'Huillier It is certified that error appears in the above-identified patent and that said Letters Patent are hereby corrected as shown below:

Title page:

Assignees:   Delphi Technologies, Inc., Troy, Mich.

Renault S.A., Boulogne Billancourt Cedex, France Signed and Sealed this Twenty-ninth Day of May, 2001

*Attest:*

NICHOLAS P. GODICI

*Attesting Officer*    *Acting Director of the United States Patent and Trademark Office*